United States Patent
Gopalakrishna et al.

(10) Patent No.: US 12,506,811 B2
(45) Date of Patent: Dec. 23, 2025

(54) SYSTEMS AND METHODS FOR FACILITATING RENDERING OF A WEB APPLICATION COMPONENT BY DIFFERENT DEVICES

(71) Applicant: Capital One Services, LLC, McLean, VA (US)

(72) Inventors: Arun Gopalakrishna, McKinney, TX (US); Andrew Ricchuiti, Dallas, TX (US); Harish Kathpalia, Plano, TX (US); Chengwei Lim, McKinney, TX (US); James Bonasera, Silver Spring, MD (US); Jacob Haugen, Kalamazoo, MI (US); Raghavendra Dharmavaram, Little Elm, TX (US)

(73) Assignee: Capital One Services, LLC, McLean, VA (US)

( * ) Notice: Subject to any disclaimer, the term of this patent is extended or adjusted under 35 U.S.C. 154(b) by 114 days.

(21) Appl. No.: 18/528,527

(22) Filed: Dec. 4, 2023

(65) Prior Publication Data
US 2025/0184401 A1    Jun. 5, 2025

(51) Int. Cl.
| | | |
|---|---|---|
| *G06F 15/16* | (2006.01) | |
| *H04L 67/02* | (2022.01) | |
| *H04L 67/51* | (2022.01) | |

(52) U.S. Cl.
CPC .............. *H04L 67/51* (2022.05); *H04L 67/02* (2013.01)

(58) Field of Classification Search
None
See application file for complete search history.

(56) References Cited

U.S. PATENT DOCUMENTS

| | | | | |
|---|---|---|---|---|
| 10,979,467 | B2 * | 4/2021 | Long | H04L 63/10 |
| 11,095,534 | B1 * | 8/2021 | Dunsmore | H04L 67/52 |
| 11,743,325 | B1 * | 8/2023 | Dunsmore | G06F 9/505 |
| | | | | 709/203 |
| 2014/0180817 | A1 * | 6/2014 | Zilkha | G06F 16/24575 |
| | | | | 705/14.55 |

(Continued)

OTHER PUBLICATIONS

Patrick El-Hage, et al.; "Improving Web Page Performance at DoorDash Through Server-Side Rendering with Next.JS"; https://doordash.engineering/2022/03/29/improving-web-page-performance-at-doordash-throughserver-side-rendering-with-next-js/; retrieved from the internet Dec. 4, 2023.

*Primary Examiner* — Phuoc H Nguyen
(74) *Attorney, Agent, or Firm* — Harrity & Harrity, LLP

(57) ABSTRACT

A web application component discovery device receives, from an application server device, a first location request associated with a web application component; identifies, using the first location request, a location of the web application component; and sends, to the application server device, first information indicating the location of the web application. This allows the application server device to obtain and render a first copy of the web application component. The web application component discovery device receives, from a user device, a second location request associated with the web application component; identifies, using the second location request, the location of the web application component; and sends, to the user device, second information indicating the location of the web application component. This allows the user device to obtain and render a second copy of the web application component.

20 Claims, 8 Drawing Sheets

(56) References Cited

U.S. PATENT DOCUMENTS

2016/0294971 A1* 10/2016 Li .................. H04L 67/568
2020/0084284 A1* 3/2020 Chauhan .............. H04L 67/51
2021/0096853 A1 4/2021 Aubert

* cited by examiner

SYSTEMS AND METHODS FOR FACILITATING RENDERING OF A WEB APPLICATION COMPONENT BY DIFFERENT DEVICES

BACKGROUND

A web application is a software application or program that is accessible through a web browser, such as of a user device (e.g., via the Internet). The web application can be configured to perform functions, provide services, or deliver content to a user of the user device. The web application can include a web application component that performs a particular function, provides a particular service, or delivers particular content for the web application. One or more web application components can be used to provide an overall functionality of the web application.

SUMMARY

Some implementations described herein relate to a web application component discovery device. The web application component discovery device may include one or more memories and one or more processors communicatively coupled to the one or more memories. The one or more processors may be configured to receive, from an application server device, a first location request associated with a web application component. The one or more processors may be configured to identify, using the first location request, a location of the web application component. The one or more processors may be configured to send, to the application server device, first information indicating the location of the web application component to allow the application server device to obtain a first copy of the web application component. The one or more processors may be configured to receive, from a user device, a second location request associated with the web application component. The one or more processors may be configured to identify, using the second location request, the location of the web application component. The one or more processors may be configured to send, to the user device, second information indicating the location of the web application component to allow the user device to obtain a second copy of the web application component.

Some implementations described herein relate to a non-transitory computer-readable medium that stores a set of instructions. The set of instructions, when executed by one or more processors of a web application component discovery device, may cause the web application component discovery device to receive, from an application server device, a first location request associated with a web application component. The set of instructions, when executed by one or more processors of the web application component discovery device, may cause the web application component discovery device to send, to the application server device and based on receiving the first location request, first information indicating a location of the web application component to allow the application server device to obtain a first copy of the web application. The set of instructions, when executed by one or more processors of the web application component discovery device, may cause the web application component discovery device to receive, from a user device, a second location request associated with the web application component. The set of instructions, when executed by one or more processors of the web application component discovery device, may cause the web application component discovery device to send, to the user device and based on receiving the second location request, second information indicating the location of the web application component to allow the user device to obtain a second copy of the web application component.

Some implementations described herein relate to a method. The method may include sending, by a web application component discovery device and to an application server device, first information indicating a location of a web application component, wherein sending the first information to the application server device allows the application server device to obtain a first copy of the web application component. The method may include sending, by the web application component discovery device and to a user device, second information indicating the location of the web application component, wherein sending the second information to the user device allows the user device to obtain a second copy of the web application component.

DETAILED DESCRIPTION

Figure 1A:
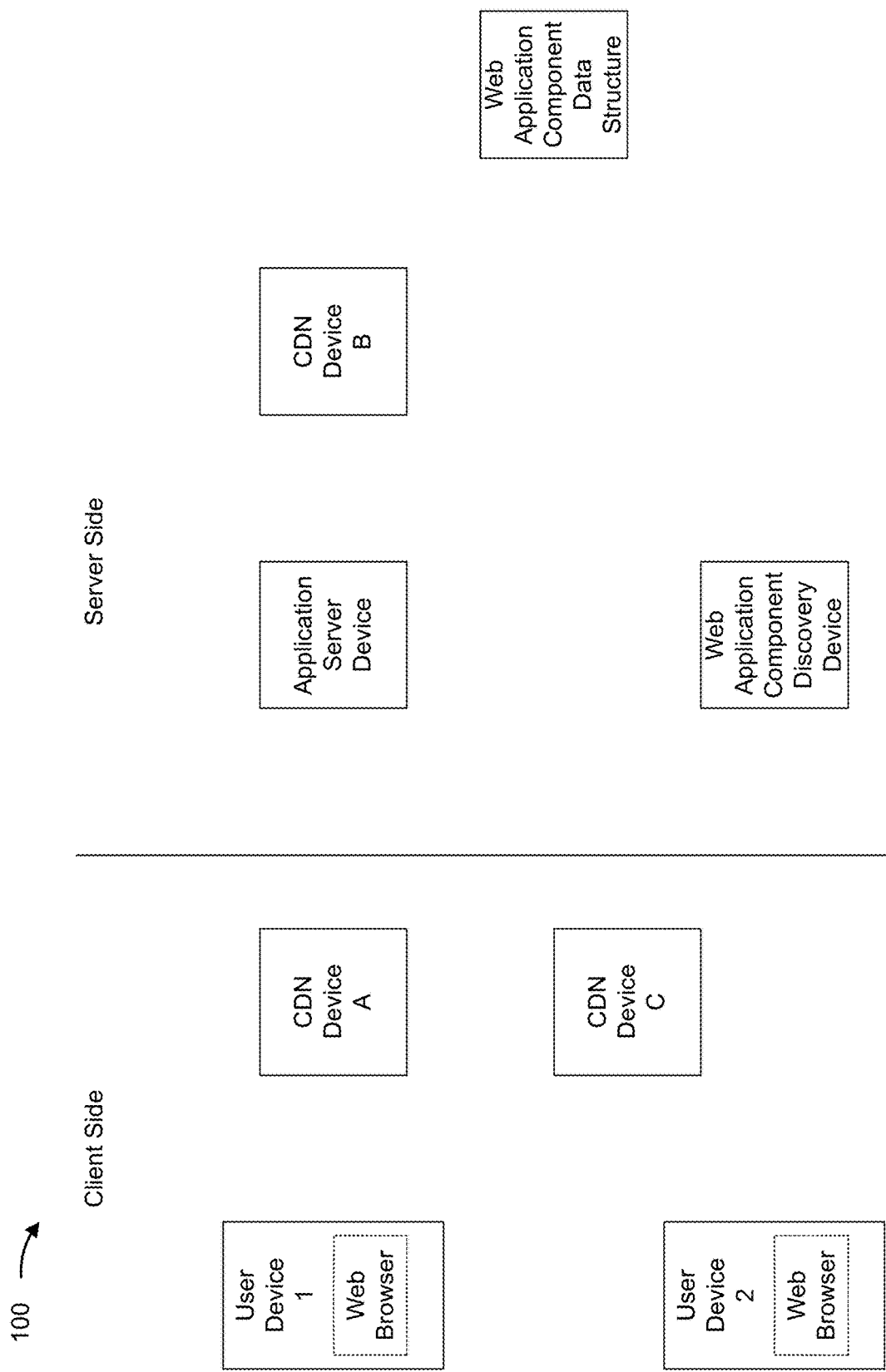
FIGS. 1A-1E are diagrams of an example implementation associated with facilitating rendering of a web application component by different devices, in accordance with some embodiments of the present disclosure.

The following detailed description of example implementations refers to the accompanying drawings. The same reference numbers in different drawings may identify the same or similar elements.

Some implementations described herein enable a web application component to be copied from a single source (e.g., a web application component data structure) and provided to different devices, such as a user device and an application server device. Each of these devices are then able to render the web application component to facilitate presentation of the web application component (e.g., via web browser). In this way, some implementations allow copies of a single web application component to be rendered in both a "client side" scenario (e.g., where the rendering is performed by the user device) and a "server side" scenario (e.g., where the rendering is performed the application server device). Accordingly, only a single web application component data structure, rather than multiple web application component data structures, is required (e.g., to store a primary version of the web application component). Therefore, additional web application component data structures are not needed, which conserves computing resources (e.g., processing resources, memory resources, communication resources, and/or power resources, among other examples) that would otherwise be consumed to configure and/or maintain the additional web application component data structures.

Further, because copies of the same web application component can be used in both the client side scenario and the server side scenario, different versions of the web application component (e.g., respectively configured for one of the scenarios) do not need to be developed and maintained. Accordingly, computing resources do not need to be consumed that would otherwise be used to support different versioning of the web application component. Additionally, because a single version of the web application component is maintained in a single web application component data structure, updating the web application component requires only a single update to the web application component data structure. Additionally, any updates that increase a computing efficiency or security of the web application component (e.g., when being rendered by a device and/or deployed on a web browser) are simultaneously available in both the client side scenario and the server side scenario.

FIGS. 1A-1E are diagrams of an example implementation 100 associated with facilitating rendering of a web application component by different devices. As shown in FIGS. 1A-1E, example implementation 100 includes a plurality of user devices (shown as user devices 1 and 2), a plurality of content delivery network (CDN) devices (shown as CDN devices A-C), an application server device, a web application component discovery device, and a web application component data structure. These devices are described in more detail below in connection with FIG. 2 and FIG. 3.

As shown in FIG. 1A, each of the user devices may include a web browser that is configured to run a web application (e.g., a web site, or another type of web application). The web application may, for example, perform functions, provide services, and/or deliver content. The web application may include one or more web application components, each of which is a part of, or a module of, the web application. A web application may, for example, perform a particular function, provide a particular service, and/or deliver particular current.

Figure 1B:
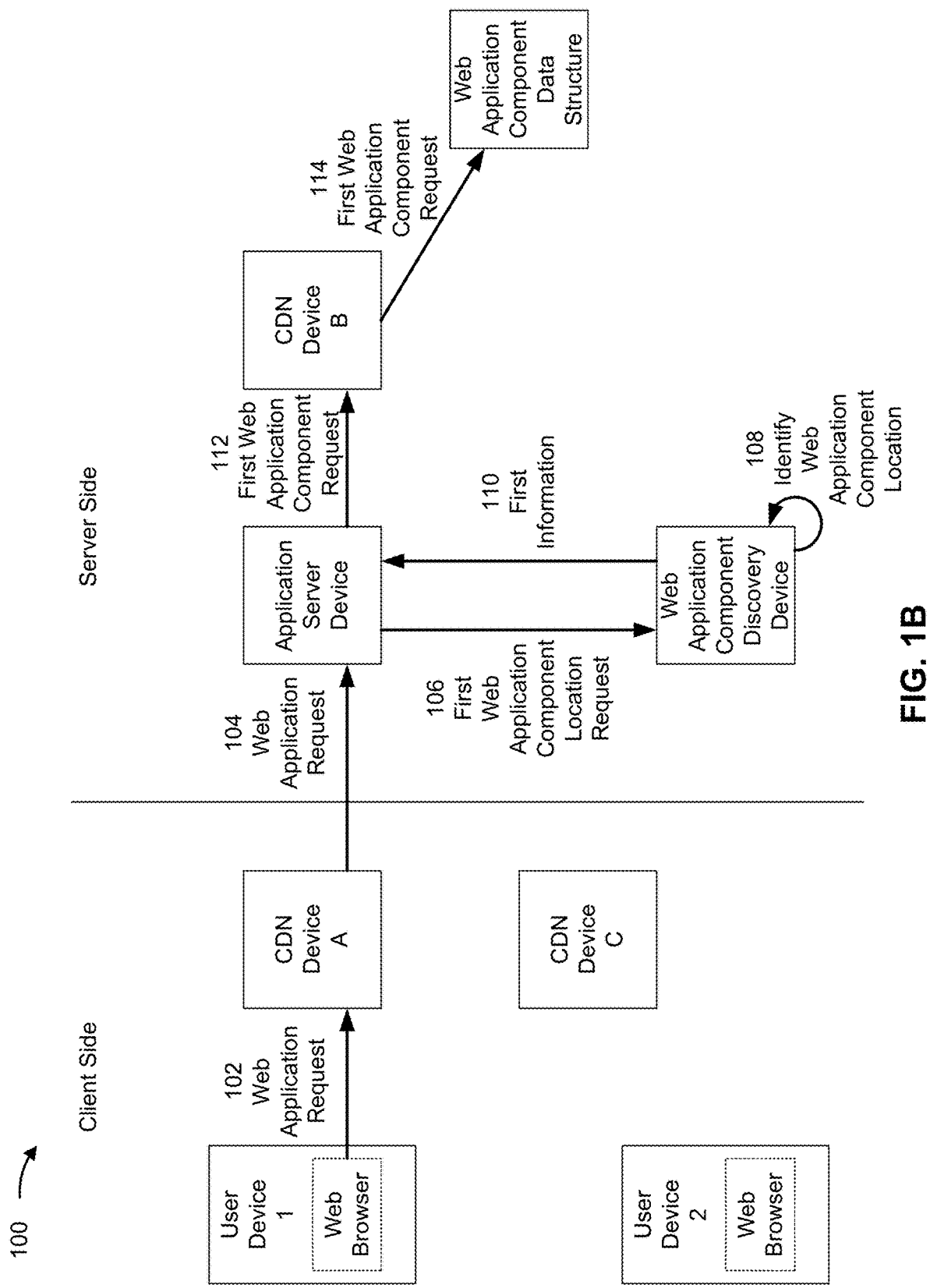
Figure 1C:
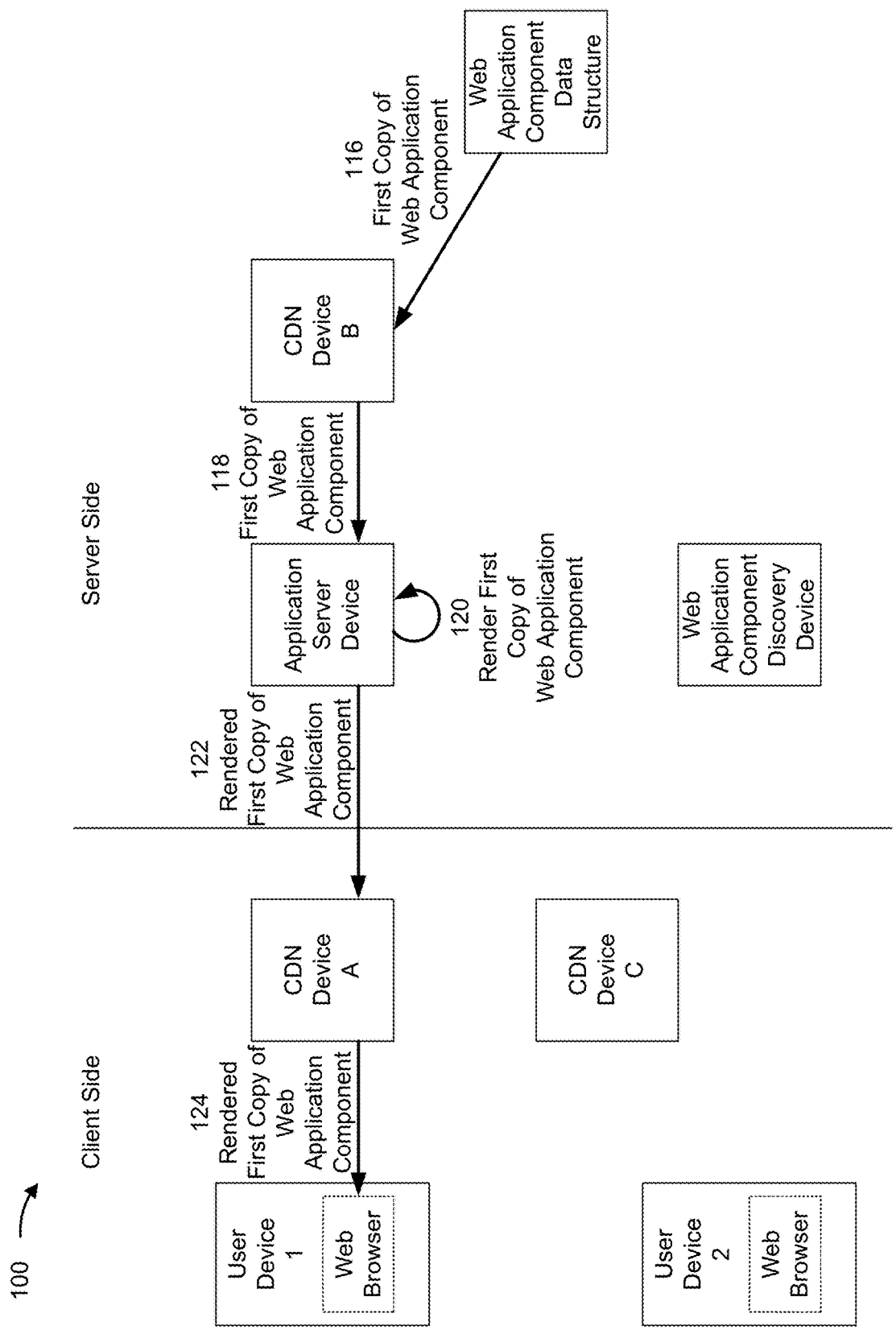
Figure 1D:
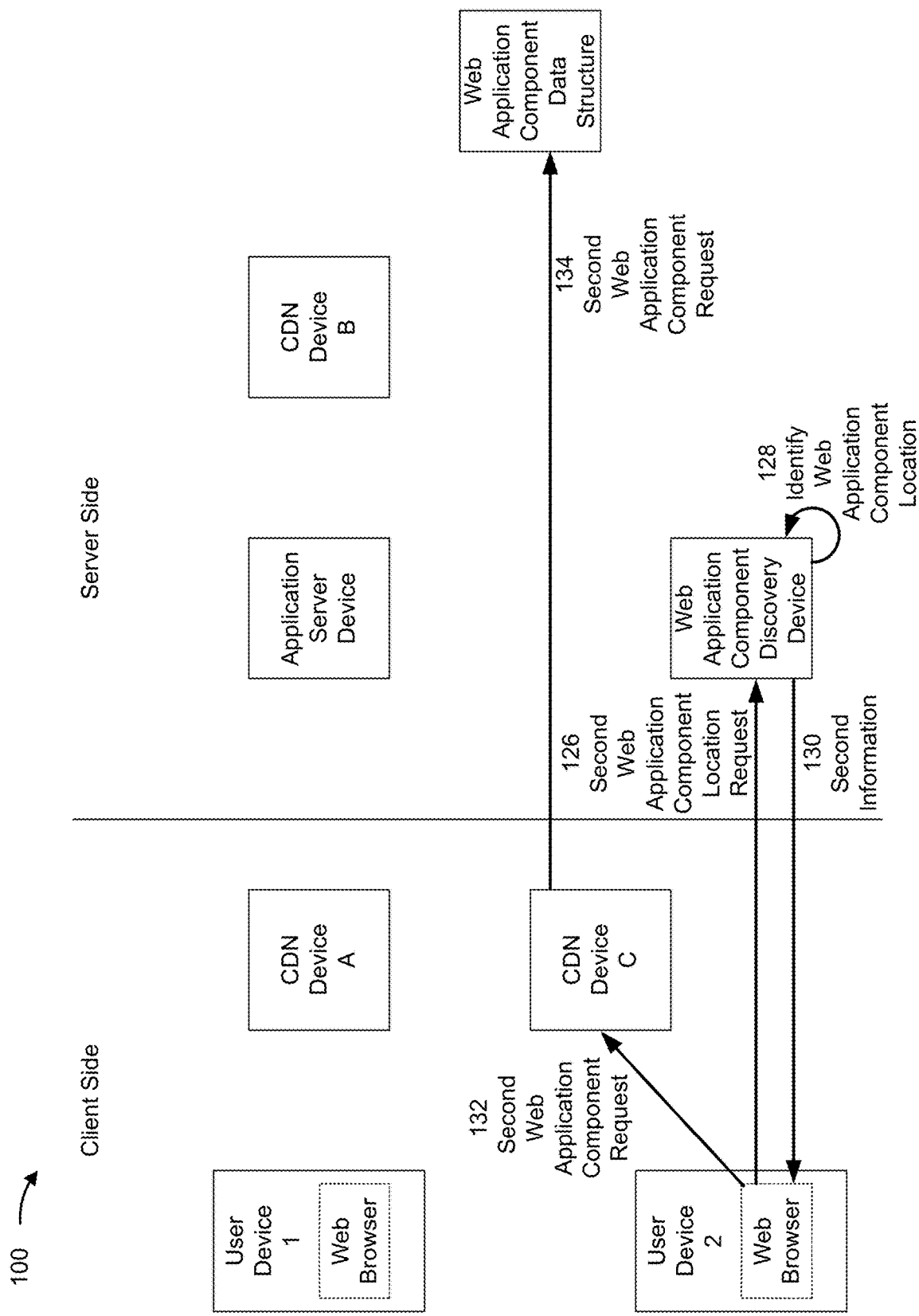
Figure 1E:
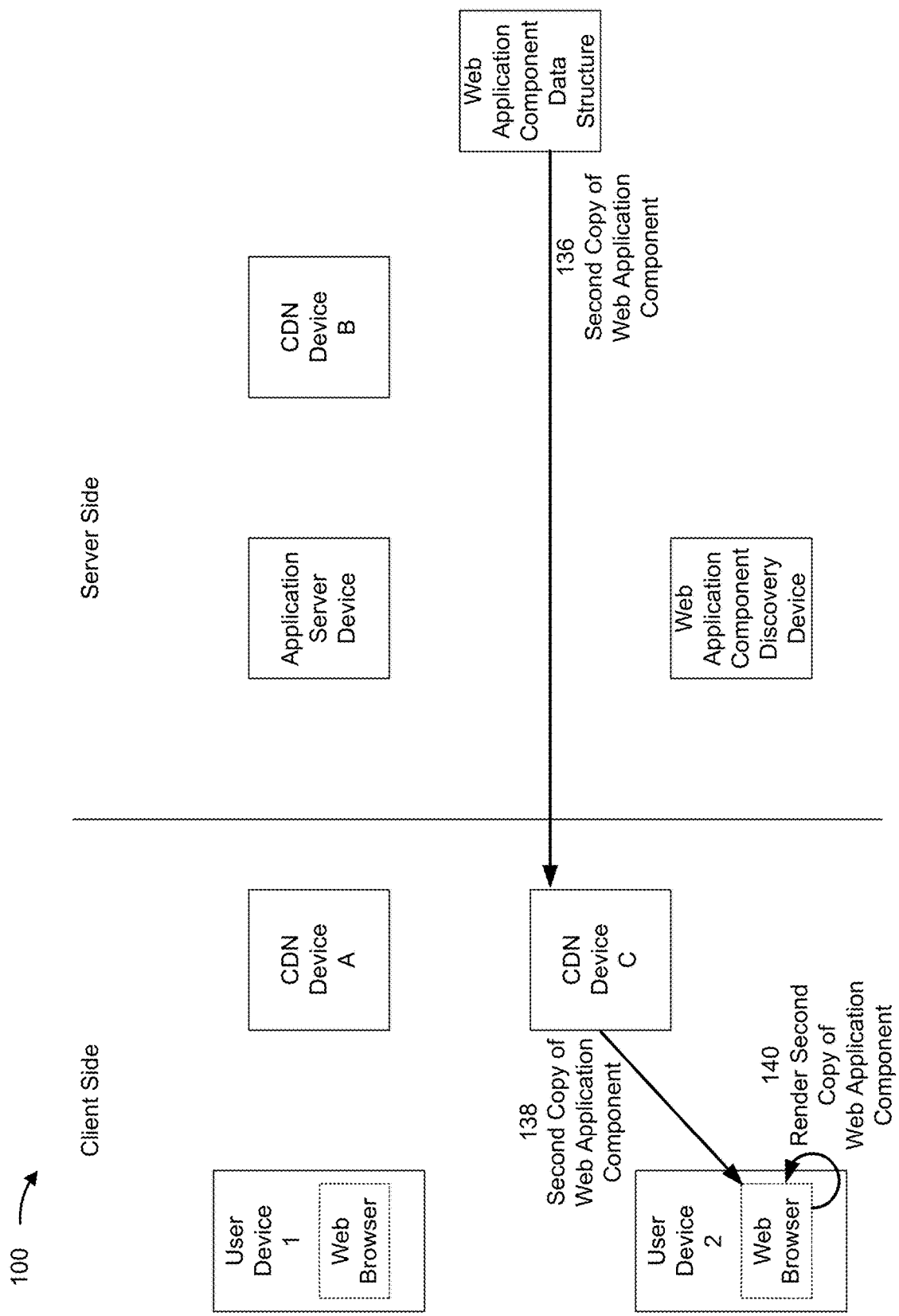

As shown in FIG. 1A, a "client side" may include the plurality of user devices (e.g., user device 1 and user device 2) and corresponding content delivery network devices (e.g., CDN device A and CDN device C, respectively). As further shown in FIG. 1A, a "server side" may include the application server device, a corresponding CDN device (e.g., CDN device B), the web application component discovery device, and the web application component data structure. FIGS. 1B-1C show operations associated with a server side web application component rendering scenario. FIGS. 1D-1E show operations associated with a client side web application component rendering scenario.

With respect to FIGS. 1B-1C, in some implementations, the user device 1 (e.g., using the web browser of the user device 1) may attempt to run a web application. For example, the user device 1, using the web browser, may attempt to access an address (e.g., a uniform resource locator (URL) address, or another address) of the web application to obtain the web application.

Accordingly, as shown in FIG. 1B, and by reference number 102, the user device 1 may send a web application request to the CDN device A (e.g., a request to obtain the web application). In some implementations, the user device 1 may send the web application request to the CDN device A via a communication link between the user device 1 and the CDN device A. Accordingly, the CDN device A may obtain the web application request from the user device 1 (e.g., receive the web application request via the communication link).

As shown by reference number 104, the CDN device A may forward (e.g., when the CDN device A has not cached a copy of the web application) the web application request to the application server device. In some implementations, the CDN device A may send the web application request to the application server device via a communication link between the CDN device A and the application server device. Accordingly, the application server device may obtain the web application request from the CDN device A (e.g., receive the web application request via the communication link).

In some implementations, the application server device may process the web application request to initiate rendering of the web application. Accordingly, as a result of initiating rendering of the web application, the application server device may identify a web application component (e.g., that is to be rendered and included in the web application).

Accordingly, as shown by reference number 106, the application server device may send a first web application component location request to the web application component discovery device. The application server device may send the first web application component location request to the web application component discovery device to request a location associated with the web application component (e.g., a location of the web application component data structure that stores a primary version of the web application component). The first web application component location request may include, for example, identification information associated with the web application component (e.g., an identifier associated with the web application component, and/or other identification information).

In some implementations, the application server device may send the first web application component location request to the web application component discovery device via a communication link between the application server device and the web application component discovery device. Accordingly, the web application component discovery device may obtain the first web application component location request from the application server device (e.g., receive the first web application component location request via the communication link).

As shown by reference number 108, the web application component discovery device may identify a location of the web application component. In some implementations, the web application component discovery device may use the first web application component location request to identify the location of the web application component. For example, the web application component discovery device may process (e.g., parse and/or read) the first web application component location request to identify the identification information associated with the web application component and may search, using the identification information, a data structure (e.g., a database, a table, or another type of data structure) that is included in and/or accessible to the web application component discovery device for an entry that indicates the location of the web application component. The location of the web application component may be, for example, an application programming interface (API) endpoint location of the web application component, and may indicate the web application component data structure (e.g., as storing a primary version of the web application component).

As shown by reference number 110, the web application component discovery device may send first information indicating the location of the web application component to the application server device. The web application component discovery device may send the first information indicating the location of the web application component to the application server device in response to the first web application component location request, and to allow the application server device to obtain a copy of the web application component (e.g., as described elsewhere herein). The first information indicating the location of the web application component may indicate, for example, the location (e.g., the API endpoint location) of the web application component, and therefore may indicate the web application component data structure.

In some implementations, the web application component discovery device may send the first information to the application server device via the communication link between the application server device and the web application component discovery device. Accordingly, the application server device may obtain the first information from the web application component discovery device (e.g., receive the first information via the communication link).

As shown by reference number 112, the application server device may send a first web application component request to the CDN device B. The application server device may send the first web application component request to the CDN device B to obtain a first copy of the web application component (e.g., from the web application component data structure, via the CDN device B). The first web application component request may identify the web application component (e.g., may include the identification information associated with the web application component) and may include, for example, the location (e.g., the API endpoint location) of the web application component.

In some implementations, the application server device may send the first web application component request to the CDN device B via a communication link between the application server device and the CDN device B. Accordingly, the CDN device B may obtain the first web application component request from the application server device (e.g., receive the first web application component request via the communication link).

As shown by reference number 114, the CDN device B may forward (e.g., when the CDN device B does not include a cached copy of the web application component) the first web application component request to the web application component data structure. In some implementations, the CDN device B may send the first web application component request to the web application component data structure via a communication link between the CDN device B and the web application component data structure. Accordingly, the web application component data structure may obtain the first web application component request from the CDN device B (e.g., receive the first web application component request via the communication link).

In some implementations, the web application component data structure may, based on receiving the first web application component request (e.g., in response to the first web application component request), generate a first copy of the web application component. The first copy of the web application component may be a duplicate of a primary version of the web application component stored in the web application component data structure. That is, the first copy of the web application component and the primary version of the web application component may be functionally equivalent (e.g., may exhibit a same functionality when rendered by a device, and may only differ in terms of non-functional information, such as a timestamp or other metadata information).

As shown in FIG. 1C, and by reference number 116, the web application component data structure may send the first copy of the web application component to the CDN device B. The web application component data structure may send the first copy of the web application component to the CDN device B to allow the application server device to obtain the first copy of the web application component.

In some implementations, the web application component data structure may send the first copy of the web application component to the CDN device B via the communication link between the CDN device B and the web application component data structure. Accordingly, the CDN device B may obtain the first copy of the web application component from the web application component data structure (e.g., receive the first copy of the web application component via the communication link).

As shown by reference number 118, the CDN device B may forward the first copy of the web application component to the application server device. In some implementations, the CDN device B may send the first copy of the web application component to the application server device via the communication link between the application server device and the CDN device B. Accordingly, the application server device may obtain the first copy of the web application component from the CDN device B (e.g., receive the first copy of the web application component via the communication link).

As shown by reference number 120, the application server device may render the first copy of the web application component. For example, the application server device may execute the first copy of the web application component (e.g., when the first copy of the web application component includes executable code, such as JavaScript) to generate the rendered first copy of the web application component (e.g., as rendered code, such as HTML).

As shown by reference number 122, the application server device may send the rendered first copy of the web application component to the CDN device A. The application server device may send the rendered first copy of the web application component to the CDN device A to provide the rendered first copy of the web application component to the user device 1 (e.g., to the web browser of the user device 1). In some implementations, the application server device may send the rendered first copy of the web application component in association with one or more other parts (e.g., one or more other rendered parts) of the web application (e.g., of the rendered web application), to allow the web application in its rendered entirety to be provided to the user device 1).

In some implementations, the application server device may send the rendered first copy of the web application component to the CDN device A via the communication link between the CDN device A and the application server device. Accordingly, the CDN device A may obtain the rendered first copy of the web application component from the application server device (e.g., receive the rendered first copy of the web application component via the communication link).

As shown by reference number 124, the CDN device A may forward the rendered first copy of the web application component to the user device 1 (e.g., to the web browser of the user device 1). In some implementations, the CDN device A may send the rendered first copy of the web application component in association with the one or more other parts (e.g., the one or more other rendered parts) of the web application (e.g., of the rendered web application, to allow the web application in its rendered entirety to be provided to the user device 1).

In some implementations, the CDN device A may send the rendered first copy of the web application component to the user device 1 via the communication link between the user device 1 and the CDN device A. Accordingly, the user device 1 (e.g., the web browser of the user device 1) may obtain the rendered first copy of the web application component from the CDN device A (e.g., receive the rendered first copy of the web application component via the communication link).

Accordingly, the user device 1 may present the rendered first copy of the web application component, such as in association with the one or more other parts (e.g., the one or more other rendered parts) of the web application (e.g., of the rendered web application). In this way, the user device 1 (e.g., the web browser of the user device 1) does not need to render the first copy of the web application component. Further, when the user device 1 is associated with a search engine (e.g., the web browser of the user device 1 is utilized by the search engine to crawl and index web applications), the web browser of the user device may be utilized to index the rendered first copy of the web application component.

With respect to FIGS. 1D-1E, in some implementations, the user device 2 (e.g., using the web browser of the user device 2) may attempt to run a web application. For example, the user device 2, using the web browser, may attempt to access an address (e.g., a uniform resource locator (URL) address, or another address) of the web application to obtain the web application. In some implementations, the user device 2 may obtain a portion of the web application (e.g., from the application server device, or another device) with an indication that the user device 2 is to obtain and render a web application component of the web application (e.g., to allow the web application in its rendered entirety to be presented in the web browser of the user device 2).

Accordingly, as shown in FIG. 1D, and by reference number 132, the user device 2 may send a second web application component location to the web application component discovery device. The user device 2 may send the second web application component location request to the web application component discovery device to request the location associated with the web application component (e.g., the location of the web application component data structure that stores the primary version of the web application component). The second web application component location request may be similar to the first web application component location request described herein in relation to FIG. 1B. For example, the second web application component location request may include identification information associated with the web application component (e.g., an identifier associated with the web application component, and/or other identification information).

In some implementations, the user device 2 may send the second web application component location request to the web application component discovery device via a communication link between the user device 2 and the web application component discovery device. Accordingly, the web application component discovery device may obtain the second web application component location request from the user device 2 (e.g., receive the second web application component location request via the communication link).

As shown by reference number 128, the web application component discovery device may identify (e.g., may identify again) the location of the web application component. In some implementations, the web application component discovery device may use the second web application component location request to identify the location of the web application component. For example, the web application component discovery device may process (e.g., parse and/or read) the second web application component location request to identify the identification information associated with the web application component and may search, using the identification information, the data structure (e.g., a database, a table, or another type of data structure) that is included in and/or accessible to the web application component discovery device for the entry that indicates the location of the web application component (e.g., the API endpoint location of the web application component), which may indicate the web application component data structure (e.g., as storing the primary version of the web application component).

As shown by reference number 130, the web application component discovery device may send second information indicating the location of the web application component to the user device 2. The web application component discovery device may send the second information indicating the location of the web application component to the user device 2 in response to the second web application component location request, and to allow the user device 2 to obtain a copy of the web application component (e.g., as described herein). The second information indicating the location of the web application component may indicate, for example, the location (e.g., the API endpoint location) of the web application component, and therefore may indicate the web application component data structure.

In some implementations, the web application component discovery device may send the second information to the user device 2 via the communication link between the user device 2 and the web application component discovery device. Accordingly, the user device 2 may obtain the second information from the web application component discovery device (e.g., receive the second information via the communication link).

As shown by reference number 132, the user device 2 may send a second web application component request to the CDN device C. The application server device may send the second web application component request to the CDN device C to obtain a second copy of the web application component (e.g., from the web application component data structure, via the CDN device C). The second web application component request may identify the web application component (e.g., may include the identification information associated with the web application component) and may include, for example, the location (e.g., the API endpoint location) of the web application component.

In some implementations, the user device 2 may send the second web application component request to the CDN device C via a communication link between the user device 2 and the CDN device C. Accordingly, the CDN device C may obtain the second web application component request from the user device 2 (e.g., receive the second web application component request via the communication link).

As shown by reference number 134, the CDN device C may forward (e.g., when the CDN device C does not include a cached copy of the web application component) the second web application component request to the web application component data structure. In some implementations, the CDN device C may send the second web application component request to the web application component data structure via a communication link between the CDN device C and the web application component data structure. Accordingly, the web application component data structure may obtain the second web application component request from the CDN device C (e.g., receive the second web application component request via the communication link).

In some implementations, the web application component data structure may, based on receiving the second web application component request (e.g., in response to the second web application component request), generate a second copy of the web application component. The second copy of the web application component may be a duplicate of the primary version of the web application component stored in the web application component data structure. That is, the second copy of the web application component and the primary version of the web application component may be functionally equivalent (e.g., may exhibit a same functionality when rendered by a device, and may only differ in terms of non-functional information, such as a timestamp or other metadata information). Accordingly, the first copy of the web application component (e.g., described above in relation to FIG. 1C) and the second copy of the web application component may be functionally equivalent.

As shown in FIG. 1E, and by reference number 136, the web application component data structure may send the second copy of the web application component to the CDN device C. The web application component data structure may send the second copy of the web application component to the CDN device C to allow the user device 2 to obtain the second copy of the web application component.

In some implementations, the web application component data structure may send the second copy of the web application component to the CDN device C via the communication link between the CDN device C and the web application component data structure. Accordingly, the CDN device C may obtain the second copy of the web application component from the web application component data structure (e.g., receive the second copy of the web application component via the communication link).

As shown by reference number 138, the CDN device C may forward the second copy of the web application component to the user device 2. In some implementations, the CDN device C may send the second copy of the web application component to the user device 2 via the communication link between the user device 2 and the CDN device C. Accordingly, the user device 2 may obtain the second copy of the web application component from the CDN device C (e.g., receive the second copy of the web application component via the communication link).

As shown by reference number 140, the user device 2 may render the second copy of the web application component. For example, the user device 2 (e.g., using the web browser of the user device 2) may execute the second copy of the web application component (e.g., when the second copy of the web application component includes executable code, such as JavaScript) to generate the rendered second copy of the web application component (e.g., as rendered code, such as HTML).

Accordingly, the user device 2 may present the rendered second copy of the web application component, such as in association with one or more other parts of the web application. In this way, the user device 2 (e.g., the web browser of the user device 1) renders the second copy of the web application component to facilitate presentation of the rendered second copy of the web application component via the user device 2 (e.g., via the web browser of the user device 2).

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
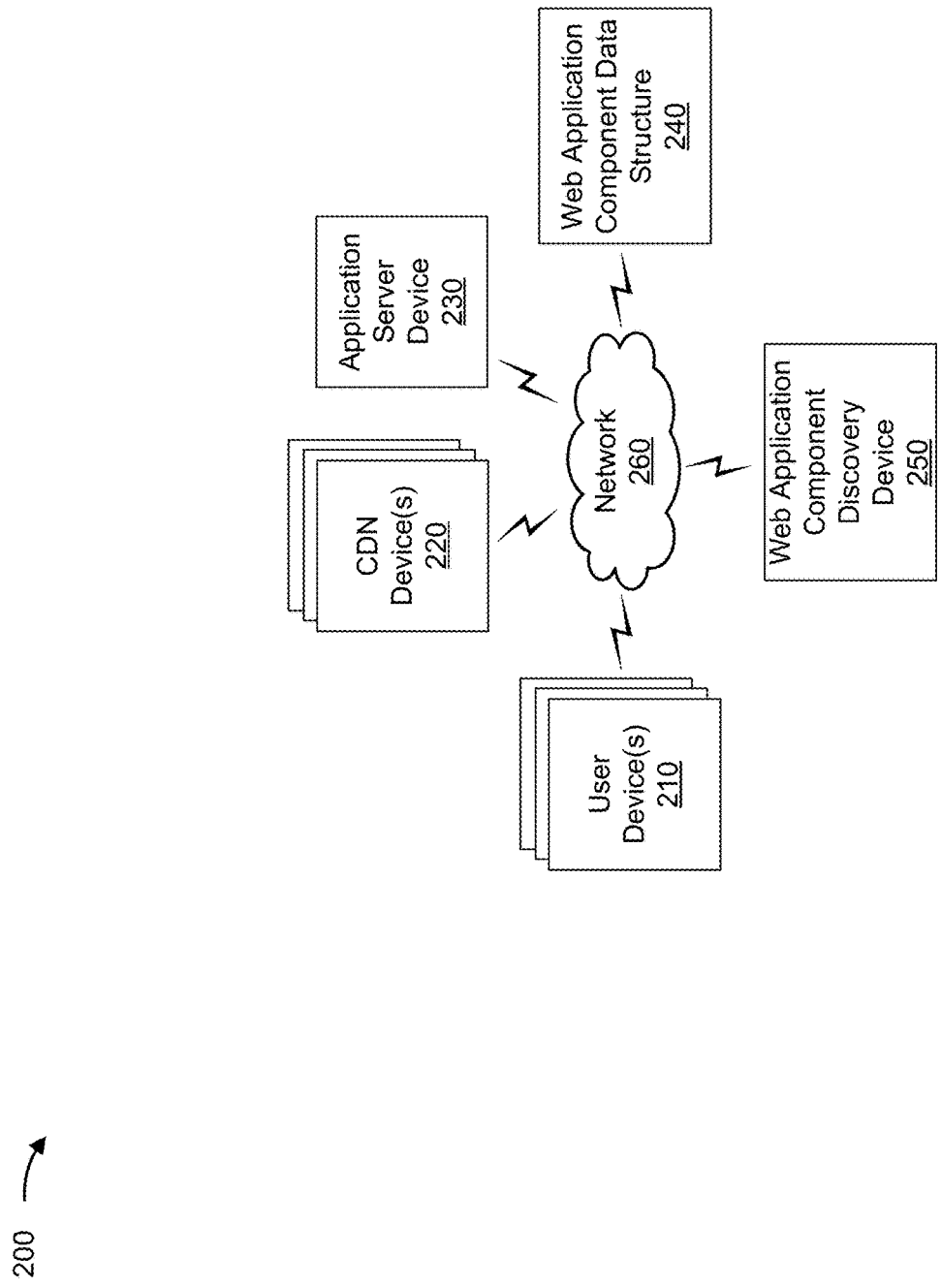
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include one or more user devices 210 (hereinafter referred to collectively as user devices 210, and individually as user device 210), one or more CDN devices 220 (hereinafter referred to collectively as CDN devices 220, and individually as CDN device 220), an application server device 230, a web application component data structure 240, a web application component discovery device 250, and a network 260. Devices of environment 200 may interconnect via wired connections, wireless connections, or a combination of wired and wireless connections.

The user device 210 may include one or more devices capable of receiving, generating, storing, processing, and/or providing information associated with facilitating rendering of a web application component by different devices, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. As another example, the user device 210 may include a server, such as an application server, a client server, a web server, a database server, a host server, a proxy server, a virtual server (e.g., executing on computing hardware), or a server in a cloud computing system. In some implementations, the user device 210 may include computing hardware used in a cloud computing environment. The user device 210 may be configured to obtain and render a web application component, as described herein.

The CDN device 220 may include one or more devices capable of receiving, generating, storing, processing, providing, and/or routing information associated with facilitating rendering of a web application component by different devices, as described elsewhere herein. The CDN device 220 may include a router, such as a label switching router (LSR), a label edge router (LER), an ingress router, an egress router, a provider router (e.g., a provider edge router or a provider core router), a virtual router, or another type of router. Additionally, or alternatively, the CDN device 220 may include a gateway, a switch, a firewall, a hub, a bridge, a reverse proxy, a server (e.g., a proxy server, a cloud server, or a data center server), a load balancer, and/or a similar device. In some implementations, the CDN device 220 may be a physical device implemented within a housing, such as a chassis. In some implementations, the CDN device 220 may be a virtual device implemented by one or more computing devices of a cloud computing environment or a data center.

The application server device 230 may include one or more devices capable of receiving, generating, storing, processing, providing, and/or routing information associated with facilitating rendering of a web application component by different devices, as described elsewhere herein. The application server device 230 may include a communication device and/or a computing device. For example, the application server device 230 may include a server, such as an application server, a client server, a web server, a database server, a host server, a proxy server, a virtual server (e.g., executing on computing hardware), or a server in a cloud computing system. In some implementations, the application server device 230 may include computing hardware used in a cloud computing environment. The application server device 230 may be configured to obtain and render a web application component, as described herein.

The web application component data structure 240 may include one or more devices capable of receiving, generating, storing, processing, and/or providing information associated with facilitating rendering of a web application component by different devices, as described elsewhere herein. The web application component data structure 240 may include a communication device and/or a computing device. For example, the web application component data structure 240 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the web application component data structure 240 may store a primary version of a web application component, as described elsewhere herein.

The web application component discovery device 250 may include one or more devices capable of receiving, generating, storing, processing, providing, and/or routing information associated with facilitating rendering of a web application component by different devices, as described elsewhere herein. The web application component discovery device 250 may include a communication device and/or a computing device. For example, the web application component discovery device 250 may include a server, such as an application server, a client server, a web server, a database server, a host server, a proxy server, a virtual server (e.g., executing on computing hardware), or a server in a cloud computing system. In some implementations, the web application component discovery device 250 may include computing hardware used in a cloud computing environment. The web application component discovery device 250 may provide information indicating a location of a web application component, as described elsewhere herein.

The network 260 may include one or more wired and/or wireless networks. For example, the network 260 may include a cellular network, a public land mobile network (PLMN), a local area network (LAN), a wide area network (WAN), a private network, the Internet, and/or a combination of these or other types of networks. The network 260 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
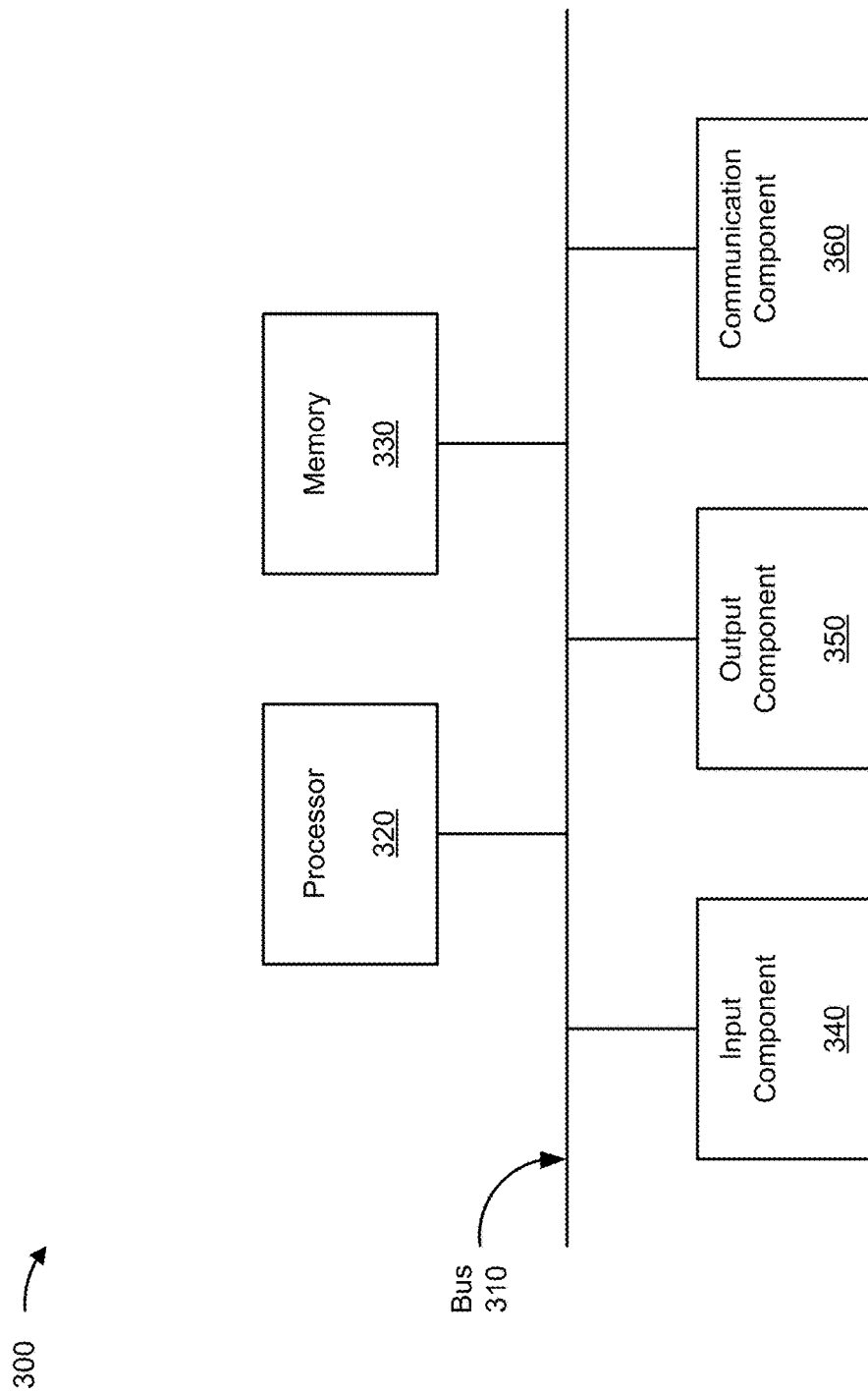
FIG. 3 is a diagram of example components of a device associated with facilitating rendering of a web application component by different devices, in accordance with some embodiments of the present disclosure.

FIG. 3 is a diagram of example components of a device 300 associated with facilitating rendering of a web application component by different devices. The device 300 may correspond to the user device 210, the CDN device 220, the application server device 230, the web application component data structure 240, and/or the web application component discovery device 250. In some implementations, the user device 210, the CDN device 220, the application server device 230, the web application component data structure 240, and/or the web application component discovery device 250 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
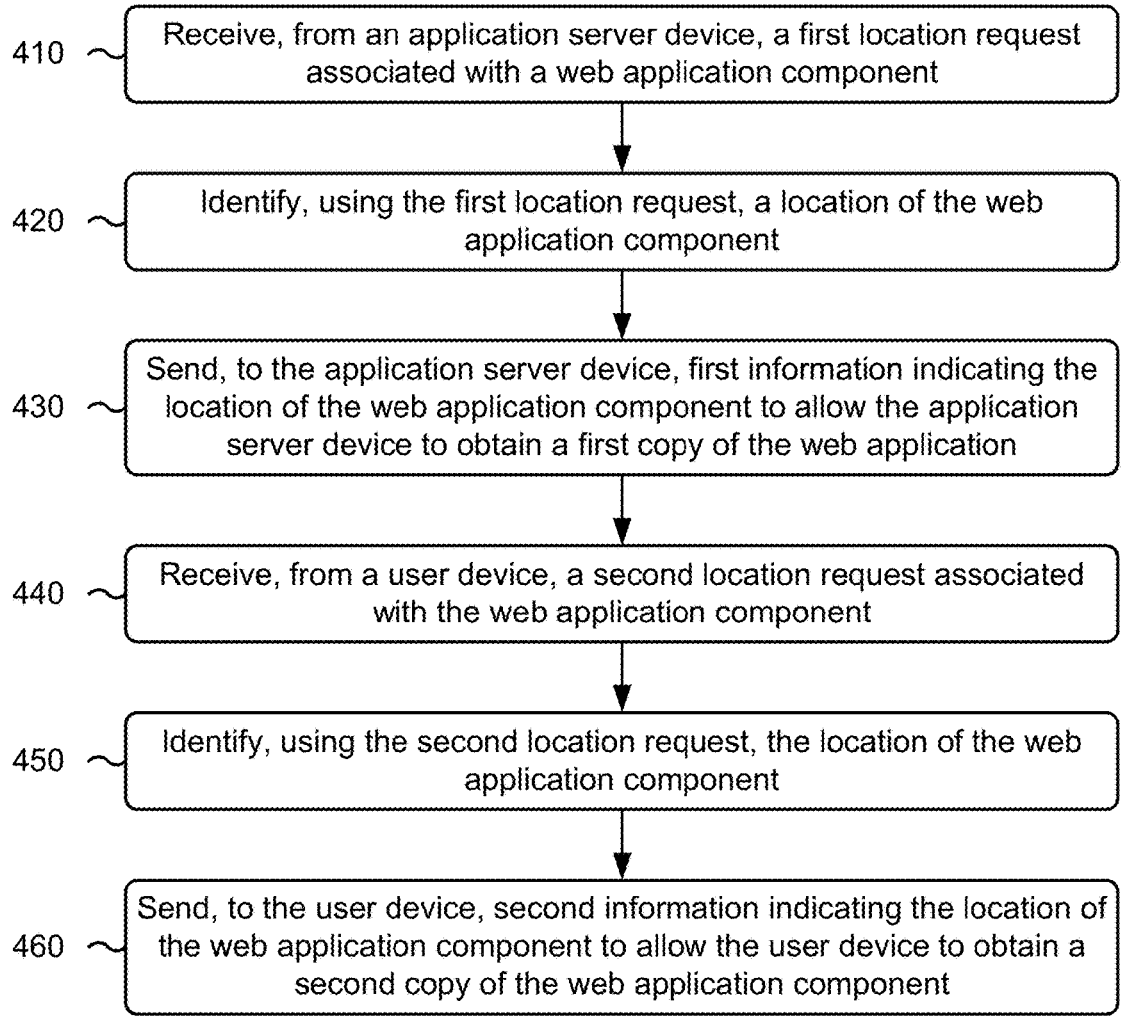
FIG. 4 is a flowchart of an example process associated with facilitating rendering of a web application component by different devices, in accordance with some embodiments of the present disclosure.

FIG. 4 is a flowchart of an example process 400 associated with facilitating rendering of a web application component by different devices. In some implementations, one or more process blocks of FIG. 4 may be performed by the web application component discovery device 250. In some implementations, one or more process blocks of FIG. 4 may be performed by another device or a group of devices separate from or including the web application component discovery device 250, such as the user device 210, the CDN device 220, the application server device 230, and/or the web application component data structure 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, from an application server device, a first location request associated with a web application component (block 410). For example, the web application component discovery device 250 (e.g., using processor 320, memory 330, input component 340, and/or communication component 360) may receive, from an application server device, a first location request associated with a web application component, as described above in connection with reference number 106 of FIG. 1B. As an example, the application server device may send the first location request to the web application component discovery device 250 to request a location associated with the web application component.

As further shown in FIG. 4, process 400 may include identifying, using the first location request, a location of the web application component (block 420). For example, the web application component discovery device 250 (e.g., using processor 320 and/or memory 330) may identify, using the first location request, a location of the web application component, as described above in connection with reference number 108 of FIG. 1B. As an example, the web application component discovery device 250 may identify a location of the web application component (e.g., a web application component data structure).

As further shown in FIG. 4, process 400 may include sending, to the application server device, first information indicating the location of the web application component to allow the application server device to obtain a first copy of the web application component (block 430). For example, the web application component discovery device 250 (e.g., using processor 320, memory 330, and/or communication component 360) may send, to the application server device, first information indicating the location of the web application component to allow the application server device to obtain a first copy of the web application component, as described above in connection with reference number 110 of FIG. 1B. As an example, the web application component discovery device 250 may send the first information to the application server device to allow the application server device to request and obtain the first copy of the web application component from the web application component data structure.

As further shown in FIG. 4, process 400 may include receiving, from a user device, a second location request associated with the web application component (block 440). For example, the web application component discovery device 250 (e.g., using processor 320, memory 330, input component 340, and/or communication component 360) may receive, from a user device, a second location request associated with the web application component, as described above in connection with reference number 126 of FIG. 1D. As an example, the user device may send the second location request to the web application component discovery device 250 to request the location associated with the web application component.

As further shown in FIG. 4, process 400 may include identifying, using the second location request, the location of the web application component (block 450). For example, the web application component discovery device 250 (e.g., using processor 320 and/or memory 330) may identify, using the second location request, the location of the web application component, as described above in connection with reference number 128 of FIG. 1D. As an example, the web application component discovery device 250 may identify (again) the location of the web application component (e.g., the web application component data structure).

As further shown in FIG. 4, process 400 may include sending, to the user device, second information indicating the location of the web application component to allow the user device to obtain a second copy of the web application component (block 460). For example, the web application component discovery device 250 (e.g., using processor 320, memory 330, and/or communication component 360) may send, to the user device, second information indicating the location of the web application component to allow the user device to obtain a second copy of the web application component, as described above in connection with reference number 130 of FIG. 1D. As an example, the web application component discovery device 250 may send the second information to the user device to allow the user device to request and obtain the second copy of the web application component from the web application component data structure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E.

Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A web application component discovery device, the web application component discovery device comprising:
   one or more memories; and
   one or more processors, communicatively coupled to the one or more memories, configured to:
      receive, from an application server device, a first location request associated with a web application component;
      identify, using the first location request, a location of the web application component;
      send, to the application server device, first information indicating the location of the web application component to allow the application server device to obtain a first copy of the web application component;
      receive, from a user device, a second location request associated with the web application component;
      identify, using the second location request, the location of the web application component; and
      send, to the user device, second information indicating the location of the web application component to allow the user device to obtain a second copy of the web application component, wherein the first copy of the web application component and the second copy of the web application component are each functionally equivalent to a primary version of the web application component stored only in a single web application component data structure without configuring or maintaining additional web application component data structures.

2. The web application component discovery device of claim 1, wherein the web application component is updated via a single update that is simultaneously available at the user device and the application server device.

3. The web application component discovery device of claim 1, wherein:
   the application server device obtains the first copy of the web application component from a first content delivery network (CDN) device associated with the single web application component data structure; and
   the user device obtains the second copy of the web application component from a second CDN device associated with the single web application component data structure.

4. The web application component discovery device of claim 3, wherein:
   the first CDN device obtains the first copy of the web application component from the single web application component data structure; and
   the second CDN device obtains the second copy of the web application component from the single web application component data structure.

5. The web application component discovery device of claim 1, wherein:
   each of the first location request and the second location request include an identifier associated with the web application component; and
   each of the first information and the second information indicate an application programming interface (API) endpoint location of the web application component.

6. The web application component discovery device of claim 1, wherein:
   sending the first information to the application server device further allows the application server device to render the first copy of the web application component and to provide the rendered first copy of the web application component to a web browser of another device; and
   sending the second information to the user device further allows a web browser of the user device to render the second copy of the web application component.

7. The web application component discovery device of claim 6, wherein the other device is associated with a search engine and the web browser of the other device is utilized by the search engine to index the rendered first copy of the web application component.

8. A non-transitory computer-readable medium storing a set of instructions, the set of instructions comprising:
   one or more instructions that, when executed by one or more processors of a web application component discovery device, cause the web application component discovery device to:
      receive, from an application server device, a first location request associated with a web application component;
      send, to the application server device and based on receiving the first location request, first information indicating a location of the web application component to allow the application server device to obtain a first copy of the web application component;
      receive, from a user device, a second location request associated with the web application component; and
      send, to the user device and based on receiving the second location request, second information indicating the location of the web application component to allow the user device to obtain a second copy of the web application component, wherein the first copy of the web application component and the second copy of the web application component are each functionally equivalent to a primary version of the web application component stored only in a single web application component data structure without configuring or maintaining additional web application component data structures.

9. The non-transitory computer-readable medium of claim 8, wherein the first copy of the web application component, the second copy of the web application component, and the primary version of the web application component exhibit a same functionality when rendered by a device.

10. The non-transitory computer-readable medium of claim 8, wherein:
    the application server device obtains the first copy of the web application component from a first content delivery network (CDN) device; and
    the user device obtains the second copy of the web application component from a second CDN device.

11. The non-transitory computer-readable medium of claim 10, wherein:
    the first CDN device obtains the first copy of the web application component from the single web application component data structure; and
    the second CDN device obtains the second copy of the web application component from the single web application component data structure.

12. The non-transitory computer-readable medium of claim 8, wherein:
    each of the first location request and the second location request include an identifier associated with the web application component; and
    each of the first information and the second information indicate an application programming interface (API) endpoint location of the web application component.

13. The non-transitory computer-readable medium of claim 8, wherein:
    sending the first information to the application server device further allows the application server device to render the first copy of the web application component; and
    sending the second information to the user device further allows a web browser of the user device to render the second copy of the web application component.

14. The non-transitory computer-readable medium of claim 13, wherein the application server device sends the rendered first copy of the web application component to another device.

15. A method, comprising:
    sending, by a web application component discovery device and to an application server device, first information indicating a location of a web application component,
       wherein sending the first information to the application server device allows the application server device to obtain a first copy of the web application component; and
    sending, by the web application component discovery device and to a user device, second information indicating the location of the web application component,
       wherein sending the second information to the user device allows the user device to obtain a second copy of the web application component, wherein the first copy of the web application component and the second copy of the web application component are each functionally equivalent to a primary version of the web application component stored only in a single web application component data structure without configuring or maintaining additional web application component data structures.

16. The method of claim 15, wherein the web application component is updated via a single update that is simultaneously available at the user device and the application server device.

17. The method of claim 15, wherein:
    the application server device obtains the first copy of the web application component from a first content delivery network (CDN) device; and the user device obtains the second copy of the web application component from a second CDN device.

18. The method of claim 15, wherein;
the second copy of the web application component is a duplicate of the primary version of the web application component.

19. The method of claim 15, wherein each of the first information and the second information indicate an application programming interface (API) endpoint location of the web application component.

20. The method of claim 15, wherein:
sending the first information to the application server device further allows the application server device to render the first copy of the web application component and to provide the rendered first copy of the web application component to another device; and
sending the second information to the user device further allows the user device to render the second copy of the web application component.

* * * * *